United States Patent
Wang et al.

(10) Patent No.: US 9,560,440 B2
(45) Date of Patent: Jan. 31, 2017

(54) APPARATUS AND METHOD FOR DETECTING LOCATION OF MOVING BODY, LIGHTING APPARATUS, AIR CONDITIONING APPARATUS, SECURITY APPARATUS, AND PARKING LOT MANAGEMENT APPARATUS

(71) Applicant: GWANGJU INSTITUTE OF SCIENCE AND TECHNOLOGY, Gwangju (KR)

(72) Inventors: Se-Myung Wang, Gwangju (KR); Kihyun Kim, Gwangju (KR); Homin Ryu, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/582,586

(22) Filed: Dec. 24, 2014

(65) Prior Publication Data
US 2015/0319524 A1 Nov. 5, 2015

(30) Foreign Application Priority Data
Apr. 30, 2014 (KR) .................. 10-2014-0052253

(51) Int. Cl.
*H04R 3/00* (2006.01)
*H04R 1/32* (2006.01)
(Continued)

(52) U.S. Cl.
CPC ............... *H04R 1/32* (2013.01); *G01S 15/10* (2013.01); *G01S 15/42* (2013.01); *H04R 1/08* (2013.01);
(Continued)

(58) Field of Classification Search
CPC ............. H04R 3/005; H04R 2201/401; H04R 2410/01; H04R 2430/20; H04R 2499/11; H04R 5/02; H04R 3/02; H04R 1/08; H04R 1/32; H04R 1/406; H04R 2201/40; H04R 2203/12; H04R 2499/15; H04R 2227/007; H04R 29/005; H04R 2201/107; H04R 2460/01; H04R 29/008; H04R 1/10; H04R 1/1091; H04R 2430/01; H04R 5/027; H04R 5/033; H04R 2430/23; H04R 25/502
(Continued)

(56) References Cited

U.S. PATENT DOCUMENTS 5,107,746 A * 4/1992 Bauer .................. G10H 1/00
                                                84/626
6,243,683 B1 * 6/2001 Peters .................. G10L 15/24
                                                434/4
(Continued)

FOREIGN PATENT DOCUMENTS

KR    1020120063272 A    6/2012

*Primary Examiner* — Akelaw Teshale
(74) *Attorney, Agent, or Firm* — Hauptman Ham, LLP

(57) ABSTRACT

An apparatus and method for detecting the location of a moving body. The apparatus may include a speaker configured to intermittently generate a pulse signal to a detection space and a microphone array configured to obtain a reflected sound of the pulse signal that is generated in the detection space. The location of a moving body is estimated by extracting a change of a sound field from the reflected sound. The present invention can be applied to an apparatus for detecting a moving body without any side effect because the location of a moving body can be accurately detected up to an angle and distance. Furthermore, the present invention can be applied to various application apparatuses, such as a lighting apparatus, an air conditioning apparatus, a security
(Continued)

US 9,560,440 B2

Page 2 apparatus, and a parking lot management apparatus because there is no problem in health and there is no side effect in application.

18 Claims, 10 Drawing Sheets

(51) Int. Cl.
H04R 1/08 (2006.01)
H04R 1/40 (2006.01)
G01S 15/10 (2006.01)
G01S 15/42 (2006.01)

(52) U.S. Cl.
CPC ............ H04R 1/40 (2013.01); H04R 3/005 (2013.01); *H04R 2201/003* (2013.01)

(58) Field of Classification Search
USPC ..... 379/92, 89, 300, 345, 66, 122, 182, 306, 379/307, 332, 333, 56, 58, 63, 83, 91, 379/94.2, 97, 26, 309, 375, 57, 1, 370, 379/71.6, 71.7
See application file for complete search history.

(56) References Cited

U.S. PATENT DOCUMENTS

| 8,471,868 | B1* | 6/2013 | Wilson | G06F 3/017 345/156 |
| 2003/0185410 | A1* | 10/2003 | June | H04R 1/406 381/94.1 |
| 2012/0294118 | A1* | 11/2012 | Haulick | G01S 7/52003 367/121 |
| 2015/0030314 | A1* | 1/2015 | Skarakis | G06K 9/00335 386/278 |

* cited by examiner

FIG. 6

| Input Signals | Steered Signals | Output Signals |
|---|---|---|
| $x_0(t) = S + \tau_0 + n_0$ | $S + n_0$ | $N \cdot S + n_0 + n_1 + \cdots + n_{N-1} = N \cdot S + \sum_{i=0}^{N-1} n_i$ |
| $x_1(t) = S + \tau_1 + n_1$ | $S + n_1$ | |
| $x_2(t) = S + \tau_2 + n_2$ | $S + n_2$ | |
| $\cdots$ | $\cdots$ | |
| $x_{N-1}(t) = S + \tau_{N-1} + n_{N-1}$ | $S + n_{N-1}$ | |

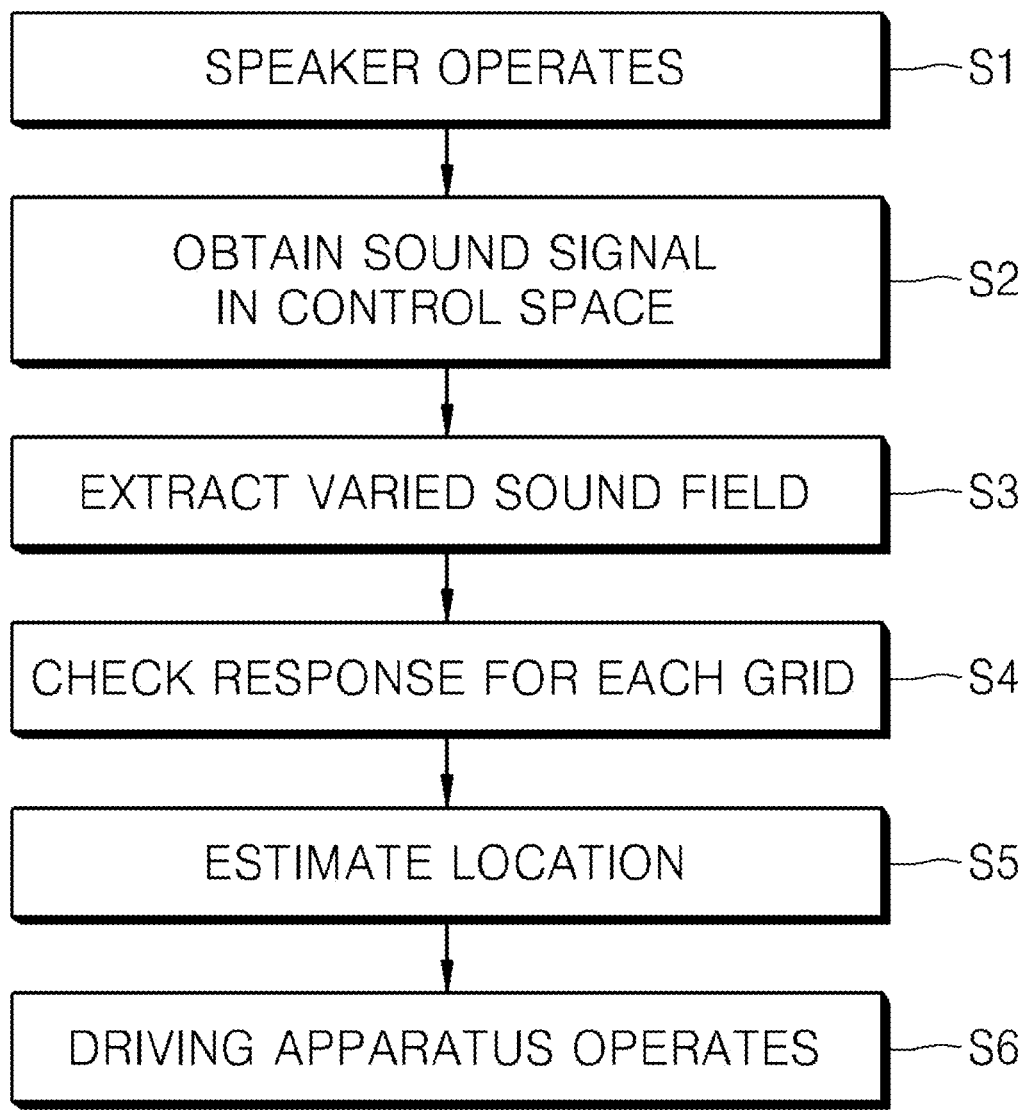

APPARATUS AND METHOD FOR DETECTING LOCATION OF MOVING BODY, LIGHTING APPARATUS, AIR CONDITIONING APPARATUS, SECURITY APPARATUS, AND PARKING LOT MANAGEMENT APPARATUS

CROSS REFERENCE TO RELATED APPLICATION

This application claims the benefit of Korean Patent Application No. 10-2014-0052253, filed on Apr. 30, 2014, entitled "APPARATUS AND METHOD FOR DETECTING LOCATION OF MOVING BODY, LIGHTING APPARATUS, AIR CONDITIONING APPARATUS, SECURITY APPARATUS, AND PARKING LOT MANAGEMENT APPARATUS", which is hereby incorporated by reference in its entirety into this application.

BACKGROUND

1. Technical Field

The present disclosure relates to an apparatus and method for detecting the location of a moving body, and a lighting apparatus, an air conditioning apparatus, a security apparatus, and a parking lot management apparatus using the apparatus and method.

2. Related Art

Existing sensors for detecting the location of a moving object may include, for example, an infrared sensor, an ultrasonic sensor, and a camera.

An infrared sensor detects a change of heat generated from a moving body and is used for the detection of the human body and location prediction. First, the infrared sensor is problematic in that it does not detect a moving body if a temperature of the moving body becomes similar to a surrounding temperature over time after the moving body enters a specific space and it may be applied to only animals including persons. Second, the ultrasonic sensor is problematic in that it is too sensitive to the spatial characteristics of space because the wavelength of an operating signal is very small. For example, if a carpet or a curtain is present in a house, an error in which a moving body is not detected may occur because an ultrasonic signal is easily absorbed by the carpet or curtain. Although the ultrasonic sensor uses high power in terms of ultrasonic waves, there is a difficulty in scanning a wide space. Third, a camera may be ideally used to detect the location of a person, but is problematic in that a specific luminous intensity must be maintained within a detection space in order to detect the location of a person.

Korean Patent Application No. 10-2010-0124374 has proposed a method of detecting a moving body using a sound by taking the problems into consideration. The cited invention proposes a technology in which changes of sound imaging are compared with each other using a continuous sound that is illustrated as a pink noise, a white noise or a sine wave and the location of a moving body is estimated. Although sound imaging is performed on the continuous sound using the technology, there is a problem in that the angle and location of the moving body are not accurately detected. Furthermore, there is a problem in that if a two-dimensional microphone is used, a sound image of a detection space including a single three-dimensional plane is not obtained.

SUMMARY

Various embodiments are directed to an apparatus and method for detecting the location of a moving body, which are capable of accurately obtaining the location, that is, angle and distance, of a moving body, detecting a wide space, and being applied without side effects in use.

Also, various embodiments are directed to a lighting apparatus, an air conditioning apparatus, a security apparatus, and a parking lot management apparatus, which are capable of maximizing convenience when a product is used using the apparatus and method for detecting the location of a moving body.

In an embodiment, an apparatus for detecting the location of a moving body may include a speaker configured to intermittently generate a pulse signal to a detection space, a microphone array configured to obtain a reflected sound of the pulse signal that is generated in the detection space, and a location estimation unit configured to estimate the location of the moving body by extracting a change of a sound field from the reflected sound. In accordance with an embodiment of the present invention, the location and angle of a moving body that vary over time can be accurately estimated.

In the apparatus for detecting the location of a moving body, the location estimation unit may estimate the location of the moving body in a delay-sum beamforming method using the extracted change of the sound field. Accordingly, the location and angle of a moving body can be accurately aware. The pulse signal may be a short sound signal having an envelope and may be intermittently generated. Accordingly, a varying sound field can be extracted, and inconvenience can be reduced without causing a problem in the sense of hearing of a user. The microphones of the microphone array may be disposed in the direction that intersects the detection space. Accordingly, the entire region can be scanned although the apparatus for detecting the location of a moving body is installed at any place. If the microphone array corresponds to a one-dimensional arrangement, the detection space may be controlled in a two-dimensional manner. If the microphone array corresponds to a two-dimensional arrangement, the detection space may be controlled in a three-dimensional manner. Accordingly, the apparatus for detecting the location of a moving body can be applied to any place. If the microphone array corresponds to a two-dimensional arrangement, the microphones of the microphone array may be arranged in a circular type. Accordingly, the same detection state can be obtained with respect to all the blocks. Each of the microphones of the microphone array may be an MEMS digital microphone. Accordingly, signal processing can be simply performed because binarization is performed on a sound conveniently.

In an embodiment, an apparatus for detecting the location of a moving body may include a speaker configured to generate a pulse signal to a detection space, a microphone configured to detect a sound of the pulse signal that has been reflected by each location of the detection space, a varying sound field extraction unit configured to extract a varying sound field that belongs to the sounds detected by the microphone and that is different from a previous sound field, a block configuration unit configured to store relative location information indicative of the location of each point of a block that partitions the detection space and a relative location of the microphone, and a location estimation unit configured to estimate the location of the moving body by scanning the detection space with reference to the relative location information and the varying sound field. In accordance with an embodiment of the present invention, the location and angle of a moving body can be accurately detected.

In accordance with an aspect, in the apparatus for detecting the location of a moving body, the microphone may be provided as the microphone array, and the scanning may be performed using a delay-sum beamforming method. Accordingly, an accurate location and angle can be calculated.

In accordance with another aspect, the apparatus for detecting the location of a moving body may be applied to an air conditioning apparatus, a lighting apparatus, and a security apparatus, thus conveniently contributing to the human life.

In an embodiment, a method for detecting the location of a moving body may include generating a pulse signal, obtaining a reflected sound of the pulse signal within a detection space, extracting a sound field varied from a previous sound field from the reflected sound, checking that the varying sound field has been generated from which grid of a block that partitions the detection space in a specific manner using a delay-sum beamforming method, and estimating a place where the varying sound field is amplified in the grid according to the delay-sum beamforming method as the location of the moving body. Accordingly, a variety of types of control using the location of a moving body as a factor can be conveniently performed because the location and angle of the moving body can be accurately detected.

In the method of detecting the location of a moving body, estimating the location of the moving body may be performed using sound pressure power. Accordingly, the location and angle of a moving body can be accurately estimated irrespective of the format of a signal that varies between a negative value and a positive value. The blocks may be configured in a two-dimensional or three-dimensional manner. Accordingly, an embodiment of the present invention can be applied to any space. The sound source of the pulse signal has an envelope and may include any one of sine waves, Gaussian signals, and Maxican hat wavelets. Accordingly, the recognition and matching of a sound can be performed more conveniently.

BRIEF DESCRIPTION OF THE DRAWINGS

FIG. 6 is a diagram illustrating delay-sum beamforming in the form of the signals of respective microphones.

FIG. 10 is a flowchart illustrating a method for detecting the location of a moving body according to an embodiment.

DETAILED DESCRIPTION

Hereinafter, an apparatus and method for detecting the location of a moving body will be described in detail with reference to the accompanying drawings through various examples of embodiments. It is however to be noted that the spirit of the present invention is not limited to the following embodiments and those skilled in the art who understand the spirit of the present invention may easily propose other embodiments included in the same range of spirit by supplementing, changing, deleting, and/or adding elements and those supplements, changes, deletions, and/or additions are construed as belonging to the spirit of the present invention.

Figure 1:
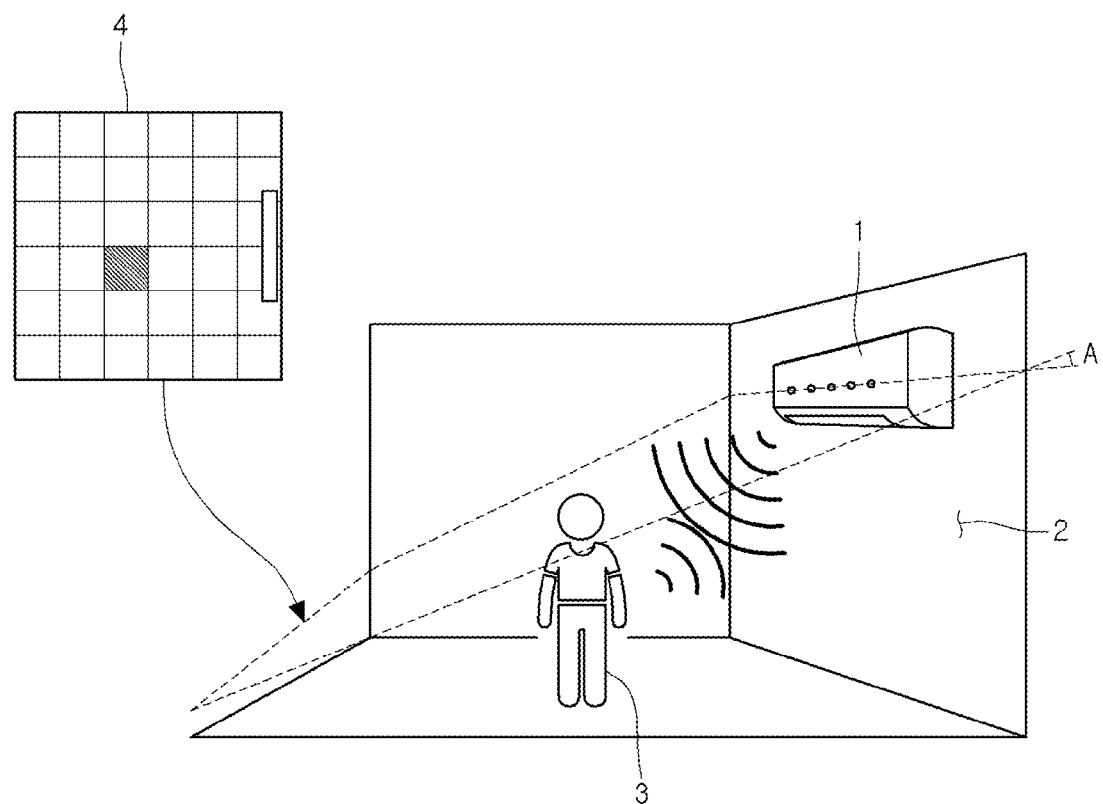
FIG. 1 is a diagram illustrating the state in which an apparatus for detecting the location of a moving body according to an embodiment is used.
Figure 2:
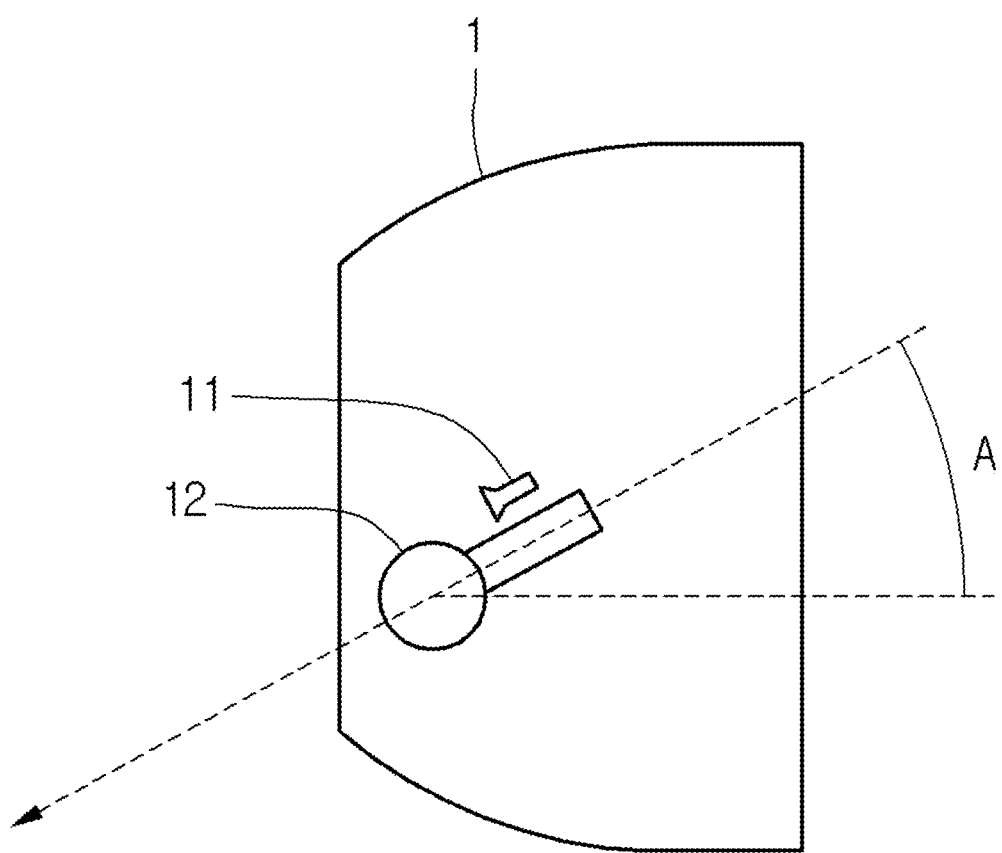
FIG. 2 is a side view of the apparatus for detecting the location of a moving body.

FIG. 1 is a diagram illustrating the state in which an apparatus for detecting the location of a moving body according to an embodiment is used, and FIG. 2 is a side view of the apparatus for detecting the location of a moving body.

Referring to FIGS. 1 and 2, the detection apparatus 1 may include a microphone array 12 and a speaker 11 disposed adjacent to the microphone array 12. The speaker 11 sends a sound to a detection space 2. The sound may be provided as a sound within a range of an audible frequency and may be a short pulse signal. The pulse signal transmitted to the detection space 2 may be reflected by the wall of the detection space 2, a stationary body placed in the detection space 2, or a moving body placed in the detection space 2. The pulse signal reflected by each reflection body may be detected by microphones that form the microphone array 12. That is, the object that reflects the pulse signal functions as a new speaker. The speaker 11 may intermittently send the pulse signal to the detection space 2, and the microphone array 12 may intermittently detect the reflected sound.

The microphone array 12 may detect a reflected sound according to the pulse signal that is intermittently transmitted and extract a change of a sound field. In this case, the sound field of a pulse signal reflected by the wall of the detection space 2 or a stationary body placed in the detection space 2 is not changed over time. In contrast, the sound field of a reflected sound reflected by a moving body placed in the detection space 2 is changed. In an embodiment, the location of a moving body can be detected by detecting a change of a sound field attributable to the moving body and analyzing a corresponding signal. Accordingly, a technology according to an embodiment may correspond to contents for estimating the location of a moving body based on a change of a sound field.

In an embodiment, the microphone array 12 may be assumed to use seven microphones. In some embodiments, the microphone array 12 may include only a single microphone. In this case, a lot of time may be taken to detect the location of a moving body because the microphone has to check a reflected sound in each direction while being rotated. Accordingly, the microphone array 12 may include a plurality of microphones, for example, at least two microphones depending on spatial characteristics. As the number of the microphones included in the microphone array 12 is increased, the location and angle of a moving body can be accurately detected.

Furthermore, the microphone of the microphone array 12 may be an analog microphone or a digital microphone. If the analog microphone is used, a process of obtaining a binarized signal through processes, such as the elimination of noises included in a sound signal detected by the analog microphone, the amplification of the signal, and the binarization of the signal, may be further performed. An MEMS digital microphone may be used because the processes for the analog microphone may not be necessary if the MEMS digital microphone is used.

The reason why the pulse signal is used is for removing noises based on the principle that a reflected sound looks like the excitation signal of the speaker 11 when the excitation signal is reflected by a reflection body and detected by the microphone array 12 as the reflected sound. However, the sudden playback of any pulse signal and the elimination of the pulse signal are impossible when the pulse signal is physically actually played back by the speaker 11. Accordingly, the pulse signal may be understood as a concept that includes a short sound signal having a specific envelope.

More specifically, the sound source of the pulse signal may include sine waves (e.g., tone bursts), a Gaussian signal, and Maxican hat wavelets each having an envelope as the pulse signal. Alternatively, the pulse signal may include a shock signal (e.g., a gunshot or a sound generated when a balloon bursts), a noise-based (e.g., a white noise or maximum length sequences) signal, or a sine wave-based (e.g., a swept sine) signal, that is, the type of signals used in a room sound field measuring scheme in room acoustics. A concise chord or melody sound may be used as the pulse signal because those signals may make consumers acoustically feel unpleasant.

A speaker having excellent signal coherence may be used as the speaker 11 so that a sound source may well form a sound field in the detection space.

Figure 3:
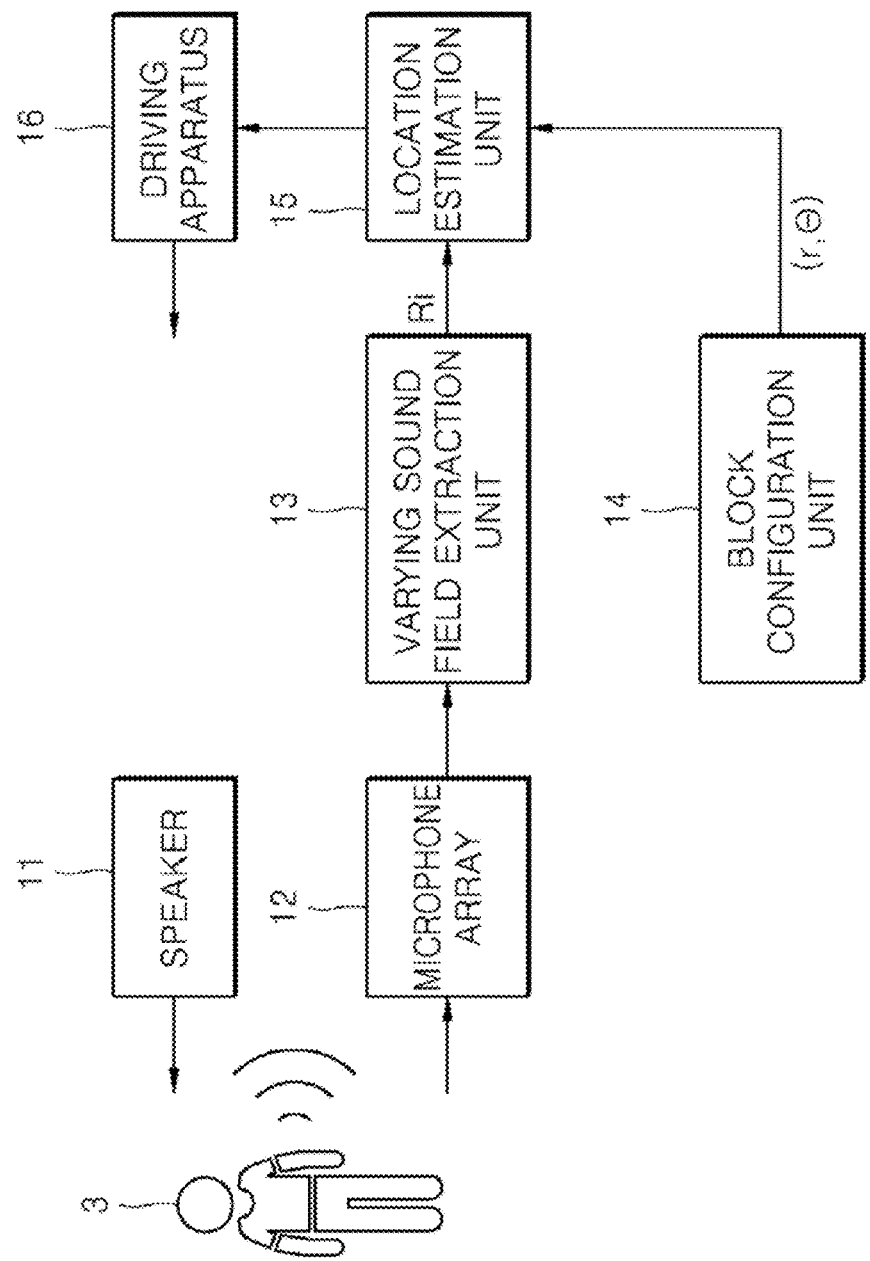
FIG. 3 is a block diagram illustrating the elements of the apparatus for detecting the location of a moving body according to an embodiment.

FIG. 3 is a block diagram illustrating the elements of the apparatus for detecting the location of a moving body according to an embodiment.

Referring to FIG. 3, a pulse signal generated by the speaker 11 is reflected by a moving body 3 and detected by the microphone array 12. In this case, a reflected sound from a stationary body may also be detected by the microphone array 12. The pulse signal continues to be intermittently transmitted to the detection space 2 as described above.

The reflected sound detected by the microphone array 12 is transferred to a varying sound field extraction unit 13. The varying sound field extraction unit 13 extracts only a reflected sound including a varied sound field. When the reflected sound passes through the varying sound field extraction unit 13, a reflected sound according to a stationary body is removed and only a reflected sound according to the moving body 3 may be extracted.

The operation of the varying sound field extraction unit 13 is described in more detail.

$$\Delta H_i = \frac{\Delta Y_i}{X} \quad \text{[Equation 1]}$$

In Equation 1, "i" is the index of each microphone included in the microphone array 12. $\Delta H_i$ is the transfer function of the detection space that is detected by an $i^{th}$ microphone, that is, a varied sound field detected by the $i^{th}$ microphone. X is a sound source, and $Y_i$ is the signal of a reflected sound received by the $i^{th}$ microphone.

Equation 1 may be expressed into Equation 2.

$$\Delta H_i \cdot X = \Delta Y_i = (Y_i + R_i) - R_i \quad \text{[Equation 2]}$$

$R_i$ is a signal obtained by measuring a varied sound field by each microphone and may be a very weak signal. Each microphone of the microphone array 12 may output a signal obtained by measuring the varied sound field so that the signal is transferred to a location estimation unit 15.

The location estimation unit 15 may estimate the location where the moving body 3 is placed, that is, detect the location of the moving body 3. A method of detecting, by the location estimation unit 15, the location of the moving body 3 may be performed using a delay-sum beamforming method.

The delay-sum beamforming method is described in detail below.

Figure 4:
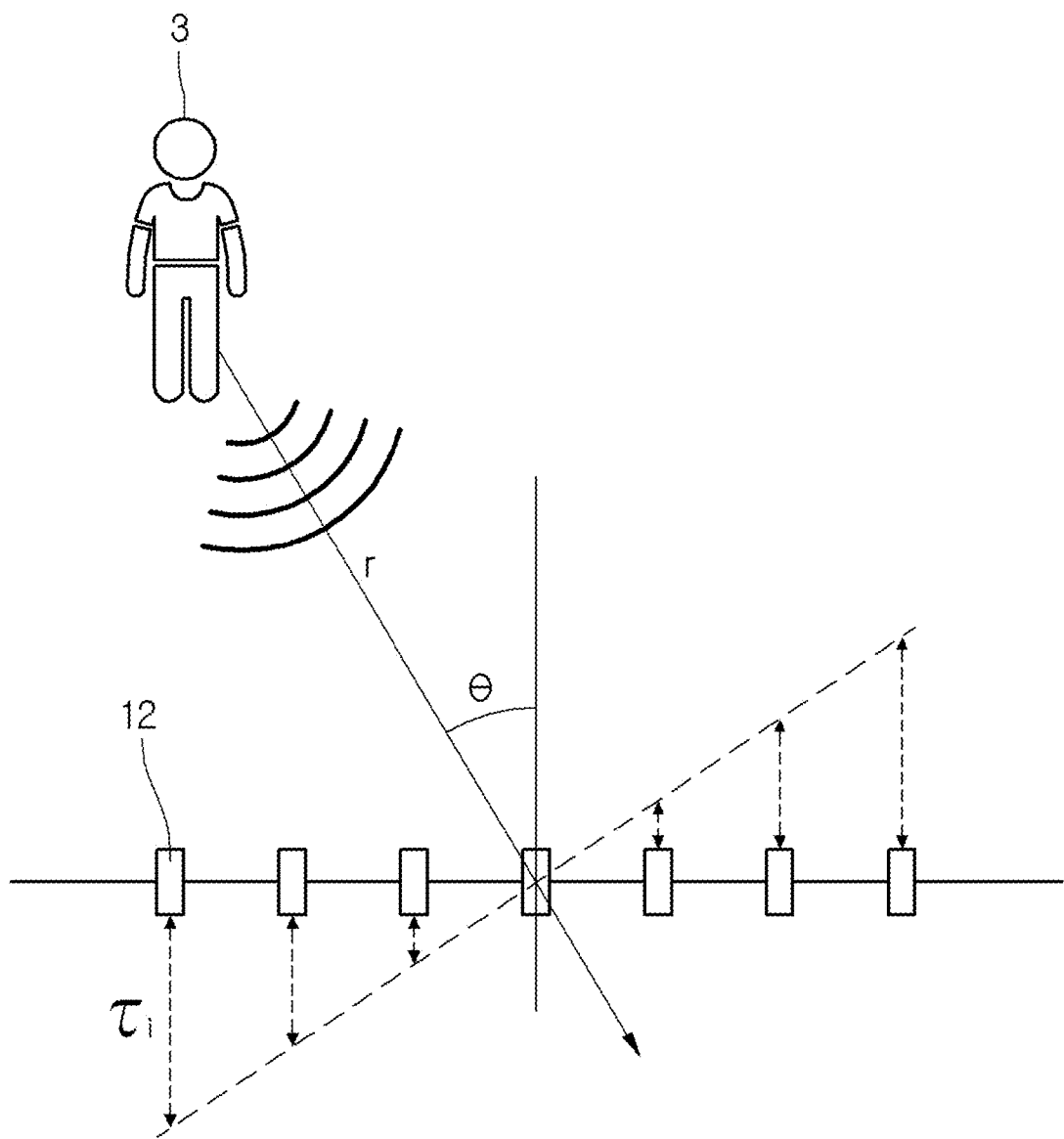
FIG. 4 is a diagram illustrating the relationship between a moving body and a microphone array.

FIG. 4 is a diagram illustrating the relationship between the moving body 3 and the microphone array 12. It is assumed that as illustrated in FIG. 4, the moving body 3 and the microphone array 12 including microphones aligned in a one-dimensional manner have a specific location relationship (r, θ). In this case, the time that is taken for a reflected sound, transmitted by a speaker (not illustrated) and reflected by the moving body 3, to reach each of the microphone may be changed by $\tau_i$ ("i" is the index of each microphone) on the basis of a reference microphone (i.e., a fourth microphone). For example, microphones on the left of a microphone (i.e., the fourth microphone) placed in the middle of the microphones of the microphone array 12 may have negative τ values and microphones on the right of the fourth microphone may have positive τ values.

The location where the moving body 3 may be placed may have been previously stored as information related to a block (see 4 of FIG. 1) within the detection space 2. For example, a specific relative location relationship of the grid center or location of the grid point of each of grids included in the block 4 with respect to each of the microphones of the microphone array 12 may have been included in a block configuration unit 14 in the form of information, that is, a distance "r" and an angle θ. Blocks included in the block configuration unit 14 may include various forms of blocks, such as a block including dense grids, a block including loose grids, and a block including different grid sizes. If grids are dense, there may be an advantage in that resolution for location detection is increased. In this case, a specific relative location relationship of the grid center or location of the grid point of each of the grids included in each block with respect to each of the microphones of the microphone array 12 may have been included in the block configuration unit 14 in the form of information, that is, a distance "r" and an angle θ.

The location estimation unit 15 fetches a $\tau_i$ value from the block configuration unit 14 by taking into consideration information about the location of a specific grid, that is, a specific relative location relationship (i.e., a distance "r" and an angle θ) of the grid center or location of the grid point of the specific grid with respect to each of the microphones of the microphone array 12. Furthermore, if a specific grid center or grid point is substituted (i.e., delayed) with a $\tau_i$ value allocated to each microphone and $R_i$ (i.e., a signal obtained by measuring a varied sound field through each microphone) is added (i.e., summed) to the results of the substitution, the varying sound field is amplified when the moving body 3 is actually placed at a corresponding location. In contrast, the varying sound field is not amplified when the moving body 3 is not actually placed at the corresponding location. The place where the moving body 3 is placed within the detection space 2 can be extracted by repetitively performing the above process on all the blocks.

Referring to FIGS. 1 and 2, the block 4 is provided on a plane that is inclined in the direction to which the microphones of the microphone array 12 are directed. Accordingly, if the apparatus 1 for detecting the location of a moving body is placed on the upper side of a wall surface, the direction to which the microphones are directed may be obliquely directed downward by a specific angle A so that the entire detection space 2 is covered. In this case, the block 4 may be provided in such a way as to intersect the detection space 2.

Figure 5:
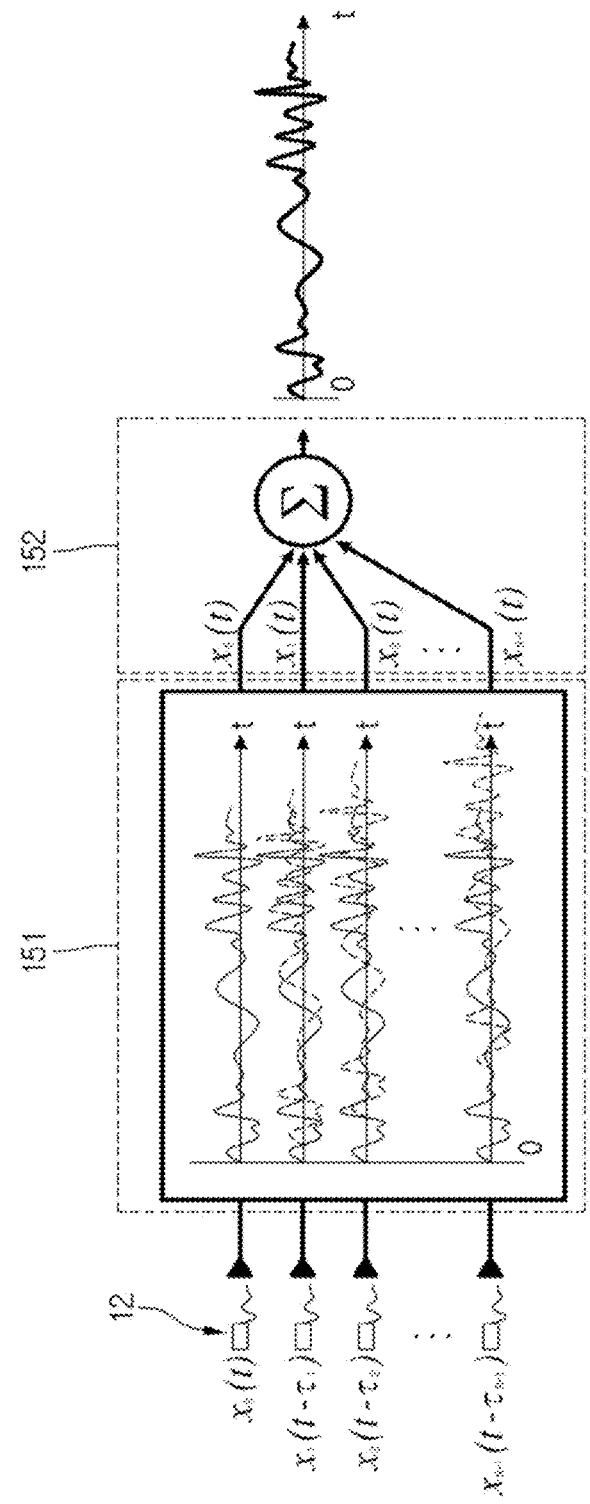
FIG. 5 is a detailed diagram illustrating the internal configuration of a location estimation unit.

FIG. 5 is a detailed diagram illustrating the internal configuration of the location estimation unit 15.

Referring to FIG. 5, the microphone signal $R_i$ corresponding to the varied sound field reflected by the moving body 3 is received through the microphone array 12. The delay unit 151 allocates a $\tau_i$ value to each microphone assuming that the microphone signal $R_i$ has been reflected from a specific point of the detection space 2 and moves the microphone signal $R_i$ on a time axis assuming that the microphone signal $R_i$ has been delayed by the $\tau_i$ value. A summation unit 152 sums up signals that have been moved by the $\tau_i$ value on the time axis. The summed signal is amplified when the moving body 3 is actually placed the specific point, but is not amplified when the moving body 3 is not actually placed the specific point.

FIG. 5 illustrates a case where the summed signal is amplified.

FIG. 6 is a diagram illustrating delay-sum beamforming in the form of the signals of microphones. Referring to FIG. 6, when each of input signals is delayed by a $\tau_i$ value, the signals are compensated by beamformed signals (i.e., steered signals) at a specific location, making all the signals identical. When the compensated signals are summed up, an output signal is amplified N times as N·S.

In this case, noises are summed up, thus becoming weak due to overlap or interference.

The microphone signal $R_i$ corresponding to the varied sound field is varied between a positive value and a negative value although it is amplified. Accordingly, power is calculated by squaring the amplified signal, so the location of a moving body can be accurately detected. The power is obtained by squaring sound pressure of a sound reflected from the place where the moving body 3 is placed in the block 4 and may be provided as sound pressure power.

Figure 7:
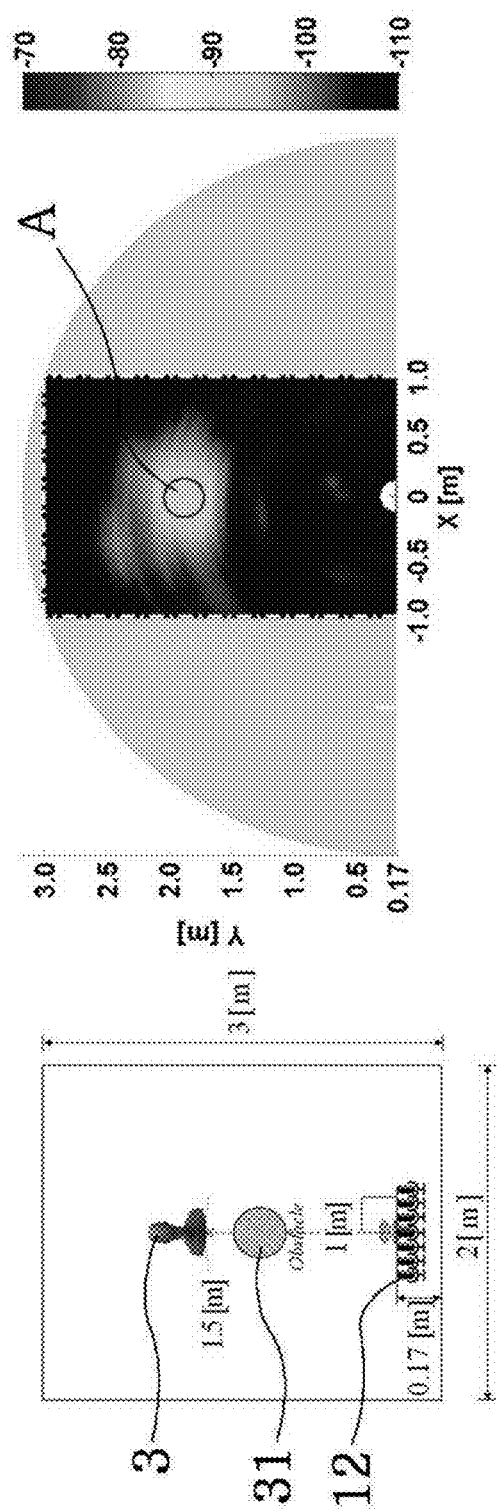
FIG. 7 illustrates the results of experiments performed on an embodiment of the present invention.

FIG. 7 illustrates the results of experiments performed on an embodiment of the present invention.

FIG. 7 illustrates the results of experiments when the moving body 3 is placed behind a stationary body 31 from a viewpoint of the microphone array 12 and illustrates lengths and sizes. A figure on the right of FIG. 7 illustrates sound pressure power. It may be seen that there is a great change of a sound field attributable to a reflected sound from a point A 3.

When the location of the moving body is detected by the above process, a driving apparatus 16 may be driven. If the driving apparatus 16 is an air conditioning component, it may perform a smart temperature control function.

In smart temperature control, a user's pleasantness placed in a control space is increased by controlling temperature and humidity based on the location of a user (i.e., a moving body), thereby being capable of increasing sensitive quality of the air conditioning apparatus. In this case, the location of the user is estimated by actively obtaining a motion of the user so that control for a pleasant environment focused on the user is performed. For example, an indirect wind may be concentrated on the direction in which the user is placed.

If the driving apparatus 16 is a lighting component, the lighting-up state of a lighting apparatus where a moving body is placed may be controlled by detecting the location of the moving body.

If the driving apparatus 16 is a security component, a trespasser may be determined, the location of the trespasser may be detected, and then an alarm may be generated. Information about the location of the trespasser may be transferred to a security camera for efficient operations.

If the driving apparatus 16 is a parking lot management component, a parking area may be checked after a moving body has left the corresponding parking area, and notification for parking may be provided. In this case, a cost for equipment can be reduced because the range of a single detection space can be increased.

Figure 8:
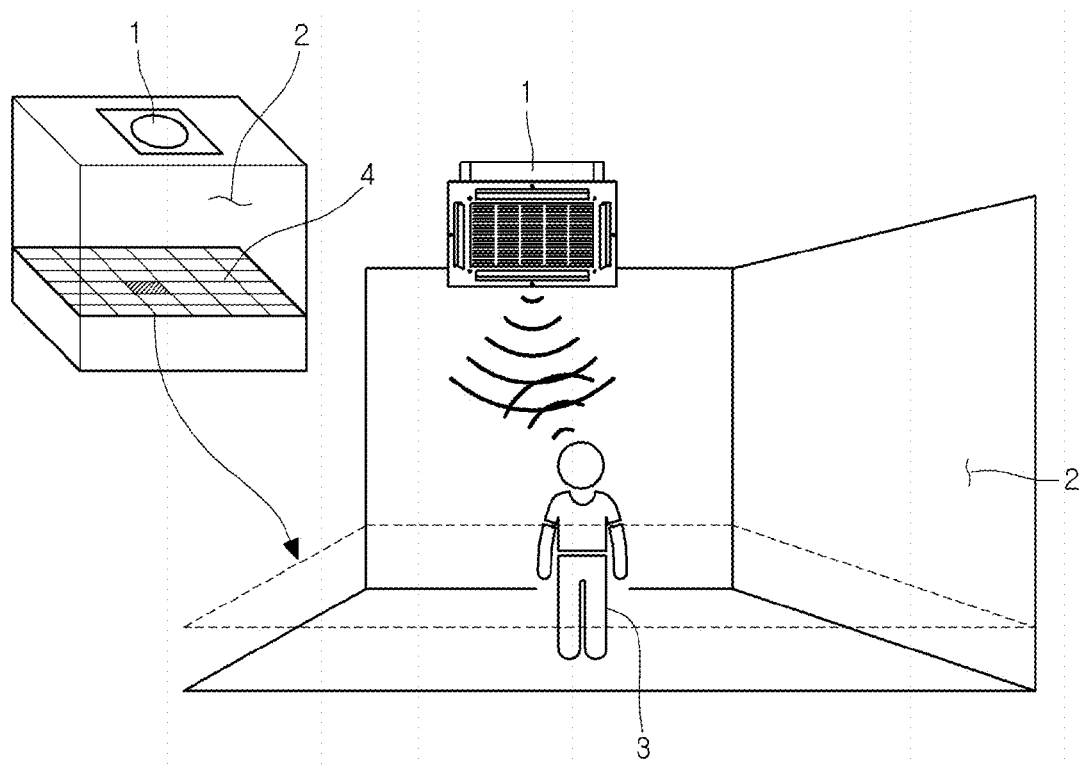
FIG. 8 is a diagram illustrating that a detection space is a three-dimensional space according to another embodiment.
Figure 9:
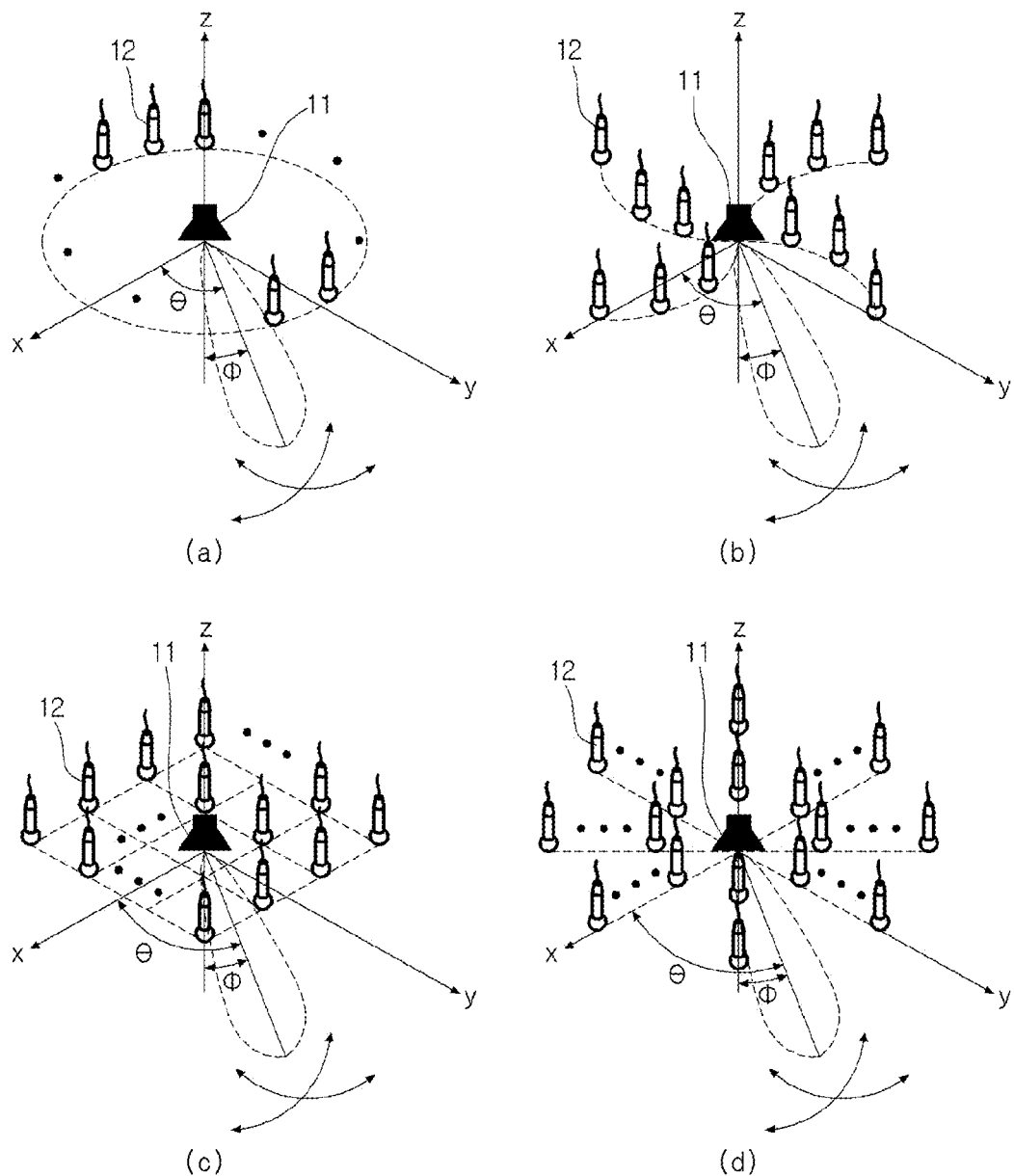
FIG. 9 is a diagram illustrating the deployment of microphone arrays.

FIG. 8 is a diagram illustrating that a detection space is a three-dimensional space according to another embodiment, and FIG. 9 is a diagram illustrating the deployment of microphone arrays.

Referring to FIGS. 8 and 9, the apparatus 1 for detecting the location of a moving body may be installed in a ceiling, and the block 4 may be the entire region of the detection space 2. Only one block has been illustrated in FIG. 8, but the block may be set in all the regions, including in the upper and lower sides of the detection space 2. A grid indicated by slant lines in FIG. 8 may be a three-dimensional location where the moving body 3 is detected as being present. In this case, as may be seen from the figures of FIG. 9, the microphones of the microphone arrays 12 of the apparatus 1 may be arranged in a circular type, a spiral type, a grid type, or a spoke wheel type in a two-dimensional manner. In those arrangements, the two-dimensional microphone array 12 may be selected depending on spatial characteristics so that the sizes of grids that form the block 4 can be partitioned without a difference in the angle of beamforming with respect to the entire detection space 2.

In an embodiment, the two-dimensional location of a moving body may be detected in a two-dimensional detection space using a one-dimensional microphone array. In another embodiment, the three-dimensional location of a moving body may be detected in a three-dimensional detection space using a two-dimensional microphone array.

In other embodiments, the same results as those of the aforementioned embodiment may be obtained by performing operation using a distance "r" and an angle θ as vector values in the case of delay-sum beamforming.

FIG. 10 is a flowchart illustrating a method for detecting the location of a moving body according to an embodiment. The same description as that of the apparatus for detecting the location of a moving body may be applied to the method for detecting the location of a moving body, and thus the description of the apparatus for detecting the location of a moving body may be applied to contents that do not require the above description.

Referring to FIG. 10, the speaker is driven to generate a pulse signal at step S1. The microphone array obtains a reflected sound according to the pulse signal in the detection space at step S2 and extracts a varied sound field from the reflected sound at step S3.

In order to check that the varied sound field has been generated from which grid of a block that partitions the detection space in a specific manner, a response is check by performing scanning using a delay-sum beamforming method at step S4. Sound pressure power is calculated, and the place having high sound pressure power may be detected as the location of a moving body at step S5.

Thereafter, the driving components of various application devices may be selectively driven at step S6.

As described above, the present invention can be applied to an apparatus for detecting a moving body without any side effect because the location of a moving body can be accurately detected up to an angle and distance. Furthermore, the present invention can be applied to various application apparatuses, such as a lighting apparatus, an air conditioning apparatus, a security apparatus, and a parking lot management apparatus because there is no problem in health and there is no side effect in application.

While various embodiments have been described above, it will be understood to those skilled in the art that the embodiments described are by way of example only. Accordingly, the disclosure described herein should not be limited based on the described embodiments.

What is claimed is:

1. An apparatus for detecting a location of a moving body, the apparatus comprising:
    a speaker configured to intermittently generate a pulse signal to a detection space;
    a microphone array configured to obtain a reflected sound of the pulse signal that is generated in the detection space; and
    a location estimation unit configured to estimate the location of the moving body by extracting a change of a sound field from the reflected sound,
    wherein, when the microphone array has a two-dimensional arrangement, the detection space is a three-dimensional space, and
    wherein the location estimation unit is further configured to extract the change of the sound field by extracting the reflected sound including a varied sound field by using a ratio of a sound source and a signal of the reflected sound received by each microphone included in the microphone array.

2. The apparatus of claim 1, wherein the location estimation unit is further configured to estimate the location of the moving body in a delay-sum beamforming method using the extracted change of the sound field.

3. The apparatus of claim 1, wherein:
    the pulse signal comprises a short sound signal having an envelope, and
    the pulse signal is intermittently generated.

4. The apparatus of claim 1, wherein microphones of the microphone array are directed toward a direction that intersects the detection space.

5. The apparatus of claim 1, wherein:
    when the microphone array has a one-dimensional arrangement, the detection space is a two-dimensional space.

6. The apparatus of claim 1, wherein the two-dimensional arrangement of the microphone array includes microphones arranged in a circular type.

7. The apparatus of claim 1, wherein each of microphones of the microphone array comprises an MEMS digital microphone.

8. The apparatus of claim 1, wherein the two-dimensional arrangement of the microphone array includes microphones arranged in a spiral type.

9. The apparatus of claim 1, wherein the two-dimensional arrangement of the microphone array includes microphones arranged in a spoken wheel shape.

10. The apparatus of claim 1, wherein the two-dimensional arrangement of the microphone array includes microphones arranged in a grid type.

11. An apparatus for detecting a location of a moving body, the apparatus comprising:
    a speaker configured to generate a pulse signal to a detection space;
    a microphone array configured to detect a sound of the pulse signal that has been reflected by each location of the detection space;
    a varying sound field extraction unit configured to extract a varying sound field that belongs to the sounds detected by the microphone array and that is different from a previous sound field;
    a block configuration unit configured to store relative location information indicative of a location of each point of a block that partitions the detection space and a relative location of the microphone array; and
    a location estimation unit configured to estimate the location of the moving body by scanning the detection space with reference to the relative location information and the varying sound field,
    wherein, when the microphone array has a two-dimensional arrangement, the detection space is a three-dimensional space, and
    wherein the varying sound field extraction unit is further configured to extract a reflected sound including the varied sound field by using a ratio of a sound source and a signal of the reflected sound received by each microphone included in the microphone array.

12. The apparatus of claim 11, wherein the scanning is performed by delay-sum beamforming.

13. The apparatus of claim 11, wherein the varying sound field extraction unit is further configured to extract the reflected sound including the varied sound field by using Equation 1:

$$\Delta H_i = \frac{\Delta Y_i}{X},$$

where
    "i" is the index of each microphone included in the microphone array,
    $\Delta H_i$ is a transfer function of the detection space that is detected by an $i^{th}$ microphone, where in the varied sound field detected by the $i^{th}$ microphone,
    X is a sound source, and
    $Y_i$ is a signal of the reflected sound received by the $i^{th}$ microphone.

14. The apparatus of claim 13, wherein the Equation 1 is expressed into Equation 2: $\Delta H_i \cdot X = \Delta Y = Y_i - (Y_i + R_i) = R_i$,
    where $R_i$ is a signal obtained by measuring the varied sound field by each microphone.

15. A method for detecting a location of a moving body, comprising:
    generating a pulse signal;
    obtaining, by a microphone array, a reflected sound of the pulse signal within a detection space;
    extracting a sound field varied from a previous sound field from the reflected sound;
    checking that the varying sound field has been generated from which grid of a block that partitions the detection space in a specific manner using a delay-sum beamforming method; and
    estimating a place where the varying sound field is amplified in the grid according to the delay-sum beamforming method as the location of the moving body,
    wherein, when the microphone array has a two-dimensional arrangement, the detection space is a three-dimensional space, and
    wherein the extracting comprises extracting the reflected sound including the varied sound field by using a ratio of a sound source and a signal of the reflected sound received by each microphone included in the microphone array.

16. The method of claim 15, wherein estimating the location of the moving body is performed using sound pressure power.

17. The method of claim 15, wherein the block is set in a two-dimensional or a three-dimensional manner.

18. The method of claim 15, wherein a sound source of the pulse signal has an envelope and comprises any one of a sine wave, a Gaussian signal, and a Maxican hat wavelet.

* * * * *